June 1, 1954 D. E. C. LAMBERT 2,680,229

FREQUENCY-MODULATED GENERATOR

Filed Nov. 4, 1948

INVENTOR
DONOVAN E. C. LAMBERT
BY Robert Harding Jr.
ATTORNEY

Patented June 1, 1954

2,680,229

UNITED STATES PATENT OFFICE 2,680,229

FREQUENCY-MODULATED GENERATOR

Donovan Ernest Charles Lambert, London, England, assignor to International Standard Electric Corporation, New York, N. Y., a corporation of Delaware Application November 4, 1948, Serial No. 58,268

Claims priority, application Great Britain November 5, 1947

7 Claims. (Cl. 332—56)

The present invention relates to frequency modulated oscillation generators employing cavity resonators as tuning elements.

At frequencies greater than about 1000 mc./s. electronic methods of frequency variation normally yield not more than about ±1% frequency variation. For uses such as in connection with altimeters and for testing purposes an oscillator is often required to have a frequency deviation of the order of ±5%.

The present invention is directed towards the attainment of such comparatively large deviations by altering the tuning of the cavity resonator.

According to the present invention an oscillation generator comprises a frequency determining cavity resonator and mechanical means for cyclically varying the tuning of said resonator by periodic changes to the electromagnetic field distribution in said resonator. These changes can of course be accomplished by deformation to the shape or volume of the resonator, as for example, by means of a vibrating piston. It is preferred, however, to use means which do not alter the external shape or the volume of the resonator. Accordingly a rotatable member, of metal or dielectric, may be arranged cyclically to vary the coupling between two opposing surfaces of said resonator; the capacity therebetween is varied or what amounts to the same thing the lines of electric force between the two said surfaces are distorted.

The invention will be described with reference to the accompanying drawings in which.

Figures 1, 2, 3, 4, 5, 6:
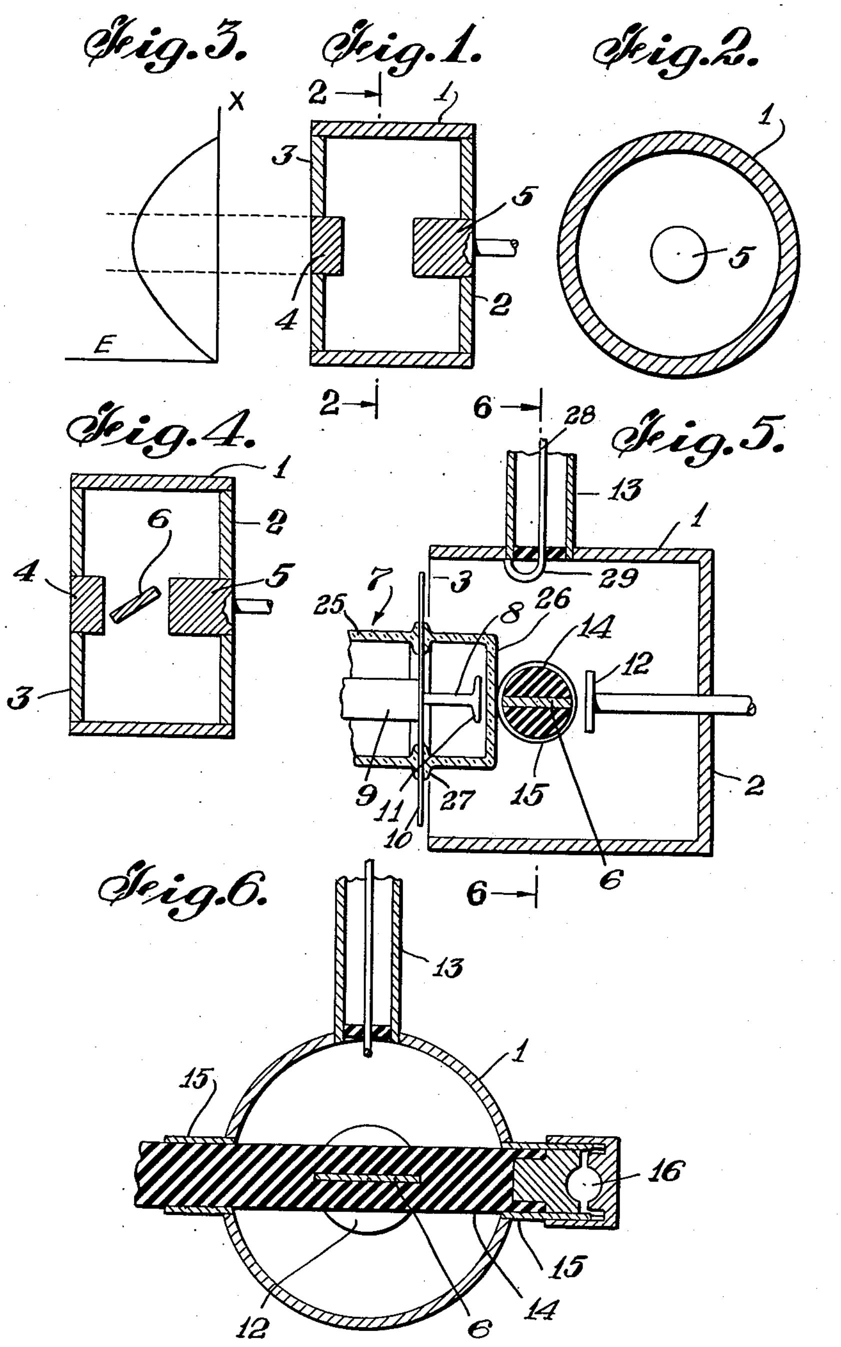
Fig. 1 shows a diametric section of a cylindrical resonator.
Fig. 2 shows a cross section along the line 2—2 of the resonator of Fig. 1.
Fig. 3 is a curve showing the distribution of electric field between the end walls of the cavity of Fig. 1.
Fig. 4 illustrates in diametric section a structure defining a resonant cavity having associated therewith variable tuning means in accordance with one form of the present invention.
Fig. 5 illustrates an oscillation generator including a preferred form of the present invention.
Fig. 6 is a cross section along the line 6—6 of Fig. 5.

Figs. 1 and 2 represent a cylindrical cavity resonator of the type commonly used for frequencies of the order of 3000 mc./s. A resonant cavity is defined by the inner surface of cylinder 1 and end plates 2 and 3. End plate 3 is shown with a projection 4 and end plate 2 is shown with a somewhat similar projection 5 which in practice may be taken to represent a tuning plunger or piston. Variation in the penetration of either 4 or 5 will result in a change of the resonant frequency of the cavity. Fig. 3 shows a plot of the electric field distribution across the cavity between 4 and 5; it will be seen to be sinusoidal in shape and has a maximum at the center. Referring now to Fig. 4, if a small metal sector 6 is rotated between members 4 and 5, a change in the capacity between the latter members is obtained, resulting in a change of resonance frequency. The change of capacity with rotation is of a sinusoidal nature and the resonance frequency of the cavity will change from maximum to minimum twice per revolution of the sector; this is useful when high modulation frequencies are desired as it helps to simplify the mechanical design of the rotor system.

A preferred embodiment of the invention is shown in Figs. 5 and 6 in which a rotatably mounted sector 6 is used to modulate a coaxial type electron velocity modulated discharge device such as disclosed in British Patent 582,937. In Figs. 5 and 6, a resonant cavity is defined by the inner walls of a closed cylinder 1, one end thereof being closed by plate 2, apertured to slidably receive a tuning piston 12. The opposite end of the cavity is partially closed by a centrally apertured member 3, the aperture thereof being adapted to receive an electron discharge device generically designated 7 and mounted to extend into the cavity defined by cylinder 1 and to complete, with member 3, the closure at that end of the cylinder. Device 7 includes a generally cylindrical element 25, closed at the inner end at 26. Cylinder 25 is preferably of glass or other suitable dielectric material, and is provided with a transverse metallic support disc 10 which is bonded to cylinder 25 throughout a circumferential area 27 which may be ribbed as shown. Disc 10 provides support for an axially disposed inner conductor 9 which has one end abutted against disc 10 and suitably joined thereto in a manner not shown. An aerial type element 11 includes a rod-like portion 8, suitably fashioned to the opposite side of disc 10 in concentric relation to conductor 9 and provided at its free end with a disc-like terminus 11.

The wall of cylinder 1 is apertured for the reception of a tubular member 13 which forms the outer conductor of a coaxial cable, the central conductor of which is shown at 28, conductor 28 terminating in the pick up loop 29, reversed to electrically contact the inner wall of cylinder 1 in a manner well known in the art. Pick up loop 29 serves in connection with a coaxial cable defined by outer and inner conductor 13 and 28 respectively to provide a suitable outlet lead for the high frequency electrical energy which is fed into the resonant cavity by means of discharge device 7, as frequency modulated in a manner described below. Disc 11, together with disc 12, at the end of piston 5 corresponds to the parts 4 and 5 of the previous figures. A tuning sector 6, which may or may not be of metal, as pointed out below, is inserted into a complementary aperture provided in a rod 14 of low loss dielectric material to provide rigid structure for the cyclic variation of an electrical field, the mean frequency of which is determined by the relative spacing of disc 12 in respect to disc 11. Rod 14 with its retained sector 6 are mounted for rotation as below described. To prevent power loss or radiation from the cavity circuit it is necessary to provide tubular extensions 15 where the dielectric rod passes through the walls of the cavity; these form wave guides operating below their cut-off frequency and hence act as attenuators; an attenuation of the order of 60 db is desirable. The dielectric rod 14 is positioned at one end by a simple form of thrust bearing 16 and is connected at the other end via a flexible coupling to a motor. An oscillation generator such as described above has been found to provide a total deviation of at least 100 mc./s. at 3000 mc./s. with a power output variation of less than 0.5 db.

It was stated that for the cavity shown in Fig. 1 a simple disc as shown in Fig. 2 on rotation produced a sinusoidal variation in frequency. This law of variation may not always be convenient and another type of law may be obtained if desired by suitable shaping of the tuning disc 6. The tuning sector used need not be made of metal, but if desired a material having a high dielectric constant, such as one of the titanate bearing ceramics, may be substituted.

What is claimed is:

1. In an oscillation generator, the combination with means defining a resonant cavity, means associated with said resonant cavity defining means and disposed at least partially within said defined cavity to effect electrical tuning thereof, said last mentioned means comprising a pair of aligned electrically conductive members maintained within said cavity in mutually spaced relation, means mounting at least one of said members for selective adjustment along the axis of alignment thereof of the spacing there-between, and means for cyclically varying the electromagnetic field distribution between said tuning elements comprising a planate member mounted for rotation, intermediate said spaced electrically conductive members, about an axis transverse of the axis of alignment of said adjustably spaced elements.

2. The device of claim 1 wherein one of said electrically conductive elements comprises an electron discharge device of the coaxial line type, and means mounting said device for projection in the said cavity in fixed relation to said cavity defining means.

3. In a device of the character described, the combination with means for defining a resonant cavity, of means for the initiation, control and modulation of an electrical energy therein, said last mentioned means including an electron discharge device for the introduction of high frequency electrical energy and including an energy transfer element of disc-like configuration, a second member of electrically conductive material including a portion of disc-like configuration slidably associated with and in electrical conductive relation to said cavity defining means for selective adjustment of space between said discs and a modulating element disposed intermediate said discs and aligned for rotation about an axis transverse of the axis of said slidably mounted member for cyclical variation of a high frequency electrical field initiated by said electrical discharge means, the mean value of said high frequency field being controlled by adjustment of said slidable member in respect to said electrical discharge member.

4. The device of claim 1 wherein said piston comprises a rod-like shank portion extending through the wall of said housing in slidable association therewith, said rod terminating internally of said housing in an enlarged disc-like portion.

5. The device of claim 1 wherein said planate member is substantially disposed in a shaft-like element of material having a high dielectric constant.

6. The device of claim 1 including a shaft-like element of dielectric material extending completely through said housing intermediate said electron discharge means and said piston and mounted for relative rotation in respect to the housing wall, said planate member being substantially imbedded in said shaft at a position of alignment with said electron discharge device and said piston.

7. A frequency modulated oscillation generator comprising an apertured housing defining a resonant cavity, a frequency adjusting piston supported within said cavity in slidable association with the wall of said housing, electron discharge means disposed in said cavity for introduction of high frequency electrical energy therein, and provided with an energy radiating member supported within spaced relation to said piston and a planate member disposed between said piston and said radiating member and mounted for rotation, whereby adjustment of said piston in respect to said capacity determines the main frequency of electrical energy introduced to resonant in said cavity, and rotation of said planate member modulates said resonant energy.

References Cited in the file of this patent

UNITED STATES PATENTS

| Number | Name | Date |
|---|---|---|
| 2,306,282 | Samuel | Dec. 22, 1942 |
| 2,351,895 | Allerding | June 20, 1944 |
| 2,402,663 | Ohl | June 25, 1946 |
| 2,410,109 | Schelleng | Oct. 29, 1946 |
| 2,411,424 | Gurewitsch | Nov. 19, 1946 |
| 2,413,391 | Usselman | Dec. 31, 1946 |
| 2,436,398 | Morton | Feb. 24, 1948 |
| 2,442,671 | Tompkins | June 1, 1948 |
| 2,451,825 | Guarrera | Oct. 19, 1948 |
| 2,455,345 | Watt | Nov. 30, 1948 |
| 2,473,535 | Maeder | June 21, 1949 |
| 2,487,547 | Harvey | Nov. 8, 1949 |
| 2,492,996 | Haxby | Jan. 3, 1950 |
| 2,513,334 | Kirkman et al. | July 4, 1950 |
| 2,545,623 | MacKenzie | Mar. 20, 1951 |
| 2,583,338 | Morse | Jan. 22, 1952 |